June 7, 1932. W. H. HUNT 1,861,863
FISHBONE REMOVING MACHINE
Filed July 29, 1929 2 Sheets-Sheet 2
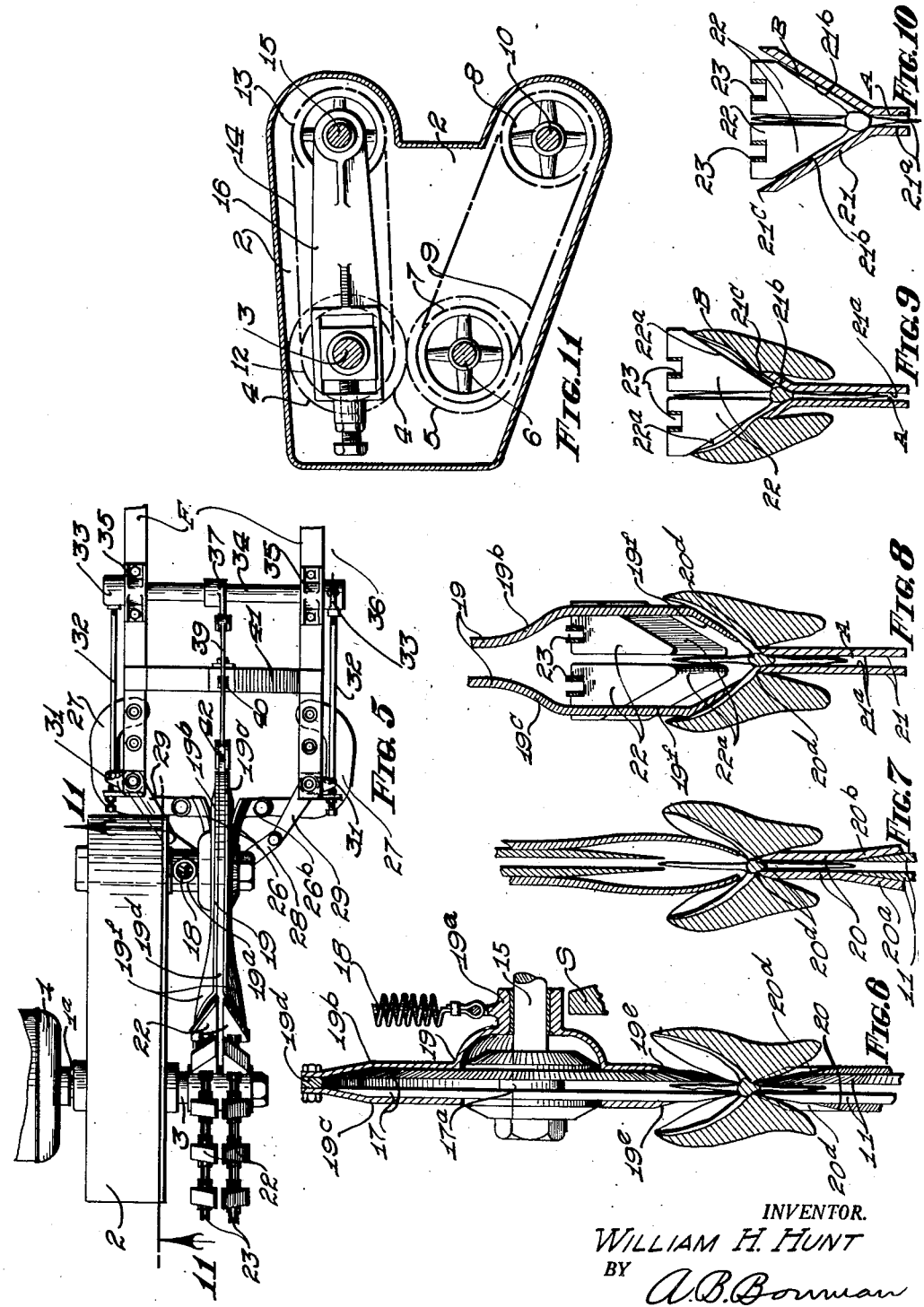
INVENTOR.
WILLIAM H. HUNT
BY
A. B. Bonman
ATTORNEY Patented June 7, 1932

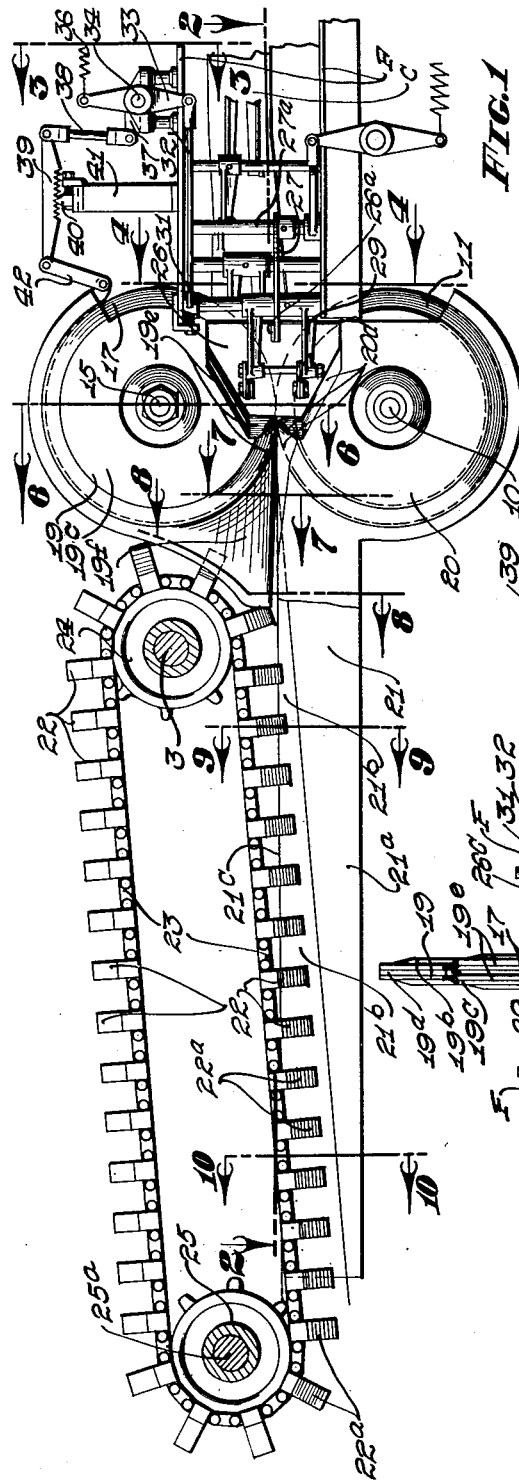
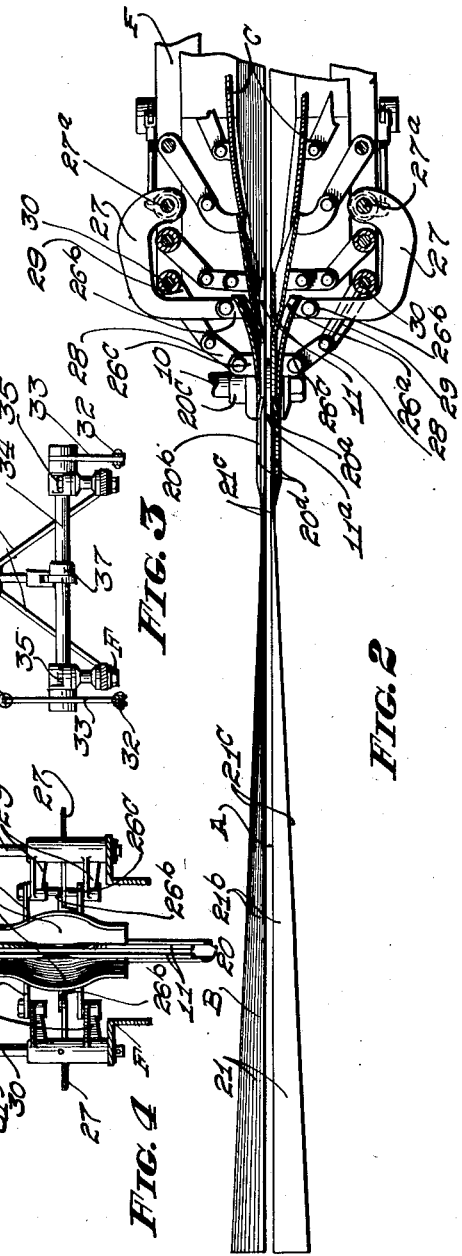

1,861,863

UNITED STATES PATENT OFFICE

WILLIAM H. HUNT, OF NATIONAL CITY, CALIFORNIA

FISHBONE REMOVING MACHINE

Application filed July 29, 1929. Serial No. 381,833.

My invention relates to fish bone removing machines and the objects of my invention are: First, to provide a machine of this class which eliminates the use of a plurality of machines formerly required to separate the meat from the bony portions of a fish; second, to provide a machine of this class which eliminates the need of manually removing any of the bony portions of a fish, thereby reducing to a minimum the manual handling of fish in preparation for canning or the like; third, to provide a machine of this class which severs the meat from the fish by making incisions along the upper and lower sides of the backbone thereof adjacent to the side of the fins and tail, then severs the remaining portions of meat from the backbone and then scrapes the flesh free from the ribs; fourth, to provide a machine of this class which is especially adapted for removing the bony portions of a fish after the head and entrails have been removed; fifth, to provide a machine of this class in which the meat free from bones is separated from the bony portions thereof in one, substantially continuous operation; sixth, to provide a machine of this class in which only a minimum amount of the edible portions of the fish are wasted, said machine performing the operation of removing bones from fish as accurately and efficiently as it is possible to do by hand; seventh, to provide a machine of this class in which the gashing blades may be adjusted so as to just clear the backbone of the fish at all times, although the backbone varies in size, thereby reducing wear on said blades; eighth, to provide a machine of this class in which movement of the blades in order to accomplish the above object is controlled by the width of the fish passing therethrough; ninth, to provide a machine of this class which performs the slicing operation with extreme rapidity without clogging or jamming; tenth, to provide a machine of this class which is safe to operate as it is easy to enclose the cutting members of said machine; eleventh, to provide a novel means of separating the ribs from the edible portions of fish; twelfth, to provide on the whole a novelly constructed machine of this class, and thirteenth, to provide a machine of this class which is extremely simple of construction proportional to its function, economical of manufacture, durable, easily maintained in a sanitary condition, efficient in its action, and which will not readily deteriorate or get out of order.

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side elevational view of my fish slicing machine with parts and portions shown in section to facilitate the illustration; Fig. 2 is a sectional view thereof through 2—2 of Fig. 1, with the rib engaging means removed and scraping knives shown in elevation to facilitate the illustration; Fig. 3 is a fragmentary transverse sectional view through 3—3 of Fig. 1 with parts and portions in elevation to facilitate the illustration; Fig. 4 is a transverse sectional view through 4—4 of Fig. 1; Fig. 5 is a fragmentary top or plan view of my fish slicing machine with the centering means removed and the driving mechanism shown diagrammatically; Fig. 6 is an enlarged fragmentary transverse sectional view through 6—6 of Fig. 1 with parts and portions shown in elevation to facilitate the illustration and showing a fish in the process of being operated upon by said machine; Fig. 7 is an enlarged fragmentary sectional view through 7—7 of Fig. 1 showing a section of fish as the scraping knives begin their operation; Fig. 8 is an enlarged transverse sectional view through 8—8 of Fig. 1 showing the fish after the scraping has progressed a little further; Fig. 9 is an enlarged transverse sectional view through 9—9 of Fig. 1 showing a further step in the scraping operation; Fig. 10 is an enlarged sectional view through 10—10 of Fig. 1 showing the bones of the fish relative to the machine just after the edible portions of said fish have been separated from the ribs, and Fig. 11 is a substantially diagrammatic view of the driving mechanism for my fish bone removing machine.

Similar characters of reference refer to similar parts and portions throughout the several views of the drawings.

Driving motor 1, driving mechanism housing 2, main drive shaft 3, driving gear 4, driven gear 5, countershaft 6, gashing blades driving sprockets 7 and 8, gashing blades driving chain 9, gashing blades shaft 10, gashing blades 11, gashing knives driving sprockets 12 and 13, gashing knives driving chain 14, gashing knives shaft 15, gashing knives shaft supporting arm 16, gashing knives 17, compensating spring 18, gashing knives housing 19, gashing blades housing 20, scraping knives 21, fin engaging fingers 22, fin engaging fingers chain 23, drive sprockets 24, idler sprockets 25, fish side engaging plates 26, forward supporting arms 27, rear supporting arms 29, link members 28, cam shafts 30, cams 31, cam rods 32, rocker arms 33, shaft 34, shaft journals 35, spring 36, arm member 37, adjustable link member 38, lever member 39, fulcrum member 40, fulcrum member support 41, and link member 42, constitute the principal parts and portions of my fish bone removing machine.

The driving mechanism of my fish bone removing machine is shown substantially diagrammatically in order to facilitate the illustration.

The shaft 1a of a suitable driving motor 1 extends into a driving mechanism housing 2 and connects with the main drive shaft 3 of said driving mechanism; said shaft being suitably journalled in said housing. Mounted upon this main drive shaft 3 within the casing 2 is a driving gear 4 which engages a driven gear 5 mounted on a countershaft 6 supported in suitable journals formed in the casing 2.

Mounted upon the countershaft 6 is a gashing blade driving sprocket 7. This sprocket, through a driving chain 9, operates a second driving sprocket 8 mounted on the gashing blade shaft 10, which shaft is suitably supported in the casing 2. The one end of the shaft 10 extends from the housing 2 and is adapted to support a pair of gashing blades 11. These gashing blades are held apart a sufficient distance from each other by a suitable spacing ring 11a. The distance between the blades 11 is just wide enough to receive the fins and tail bones of a fish.

Mounted on the main drive shaft 3 is a gashing knife driving sprocket 12. A chain 14 links this sprocket 12 with a second gashing knife driving sprocket 13 mounted on the gashing knife shaft 15. The gashing knife shaft 15 is journalled in bearings at the end of a supporting arm 16. This arm 16 in turn is journalled on the main drive shaft 3 so as to permit arcuate movement of the shaft 15 relative to the shaft 3. This arcuate movement is so slight that the shaft 15 moves substantially vertically.

Mounted upon the shaft 15 in vertical alinement with the gashing blades 11 is a pair of gashing knives 17 which are held in spaced relation to each other by an annular spacing member 17a.

Each gashing blade 11 and each gashing knife 17 consists of a thin disc having a sharpened periphery and designed to cut while travelling at a relatively high speed.

A compensating spring 18, the lower end of which is secured to a collar 19a forming a portion of the gashing knives housing 19, as shown in Fig. 6, balances the weight of the arm 16, chain 14, gear 13 and housing 19 upon the shaft 15.

Surfaces of the corresponding gashing knives and blades are flush with each other. In order to prevent the cutting edges of the gashing knives from engaging the cutting edges of the gashing blades, a suitable stop member S is provided which may engage the collar 19a. It is preferred that said gashing knives be separated from the gashing blades by a very slight distance when said stop member S engages the collar 19a. Movement of the fish between the blades and knives causes said gashing knives, by suitable mechanism to be described hereinafter, to raise and just clear the backbone of the fish.

The gashing knives housing 19 consists of two side portions 19b and 19c. The side member 19b is connected to the collar 19a. The side member 19c is secured to the member 19b by an arcuate connecting strip 19d which just clears the outer periphery of the gashing knives 17. The side members 19b and 19c fit closely to the outer surfaces of their respective gashing knives, as shown in Figs. 1, 4, 5 and 6.

The upper and rear sides of the housing side members 19b and 19c extend past the periphery of their respective gashing knives. The forward side and lower side adjacent thereto stops short of the periphery of the knives, as shown best in Fig. 1. The connecting member 19d at the point where the side members 19b and 19c are cut away protrudes slightly and forms a loop engageable with a shifting mechanism, to be described hereinafter.

The lower and forward side edges of the cut away portions of the side members 19b and 19c are sharpened as indicated by 19e. These sharpened edges closely conform to the outer surfaces of the respective gashing knives and scrape them. These sharpened portions 19e form the forward side of deflector portions 19f. The lower edges of these sharpened portions 19e terminate flush with the periphery of their respective gashing knives just behind the point of tangency between the gashing knives and gashing blades.

The gashing blades 11 are enclosed by a housing 20 similar to the gashing knives housing 19. The gashing blades housing 20 consists of two side members 20a and 20b adapted to closely conform to the outer peripheries of their respective gashing blades. The housing 20b is connected to a collar 20c mounted on the gashing blades driving shaft 10, as indicated in Fig. 2.

The forward portion and upper side adjacent thereto of the housing 20 is similar in shape to the housing 19. Said housing side members 20 are provided with sharpened, forward, upper edges 20d corresponding to the sharpened edges 19c of the gashing knives housing. The space formed between these sharpened edges 19e and 20d is covered by fish side engaging plates, to be described hereinafter.

Scraping knives 21 form a continuation of the lower or gashing blade housing 20. Each scraping knife consists of a vertically positioned, rearwardly extending portion 21a, the inner surface of which is flush with the inner surface of its respective gashing blade. These two vertically positioned portions 21a form between each other a slit A equal in width to the space between the gashing blades. The vertically positioned portions 21a at the junction with their respective housing side members extend to the upper side of said gashing knives, as shown in Figs, 1 and 2. From this point, the upper edge of each vertically positioned portion 21a slants downwardly the portions 21b of the scraping knives 21 above the aforementioned vertically positioned portions extend upwardly and outwardly forming a V-shaped trough B which increases in size as said scraping knives extend from the housing 20.

The upper edges 21c of these trough portions 21b are sharpened forming scraping knives, as indicated in Figs. 1, 2, 6, 7, 8, 9 and 10. These knives form a continuation of the sharpened portions 20d. The forward end of the trough B formed by the portions 21b decreases to nothing at the junction with said gashing blades housing 20.

The knife edges 21c of the scraping knives are formed by beveling the outside of the respective scraping knives so that the inside of said knife edges form a continuation of the trough portion 21b, as shown best in Figs. 9 and 10.

The trough B formed between the two cross portions 21b is adapted to receive a plurality of finger members 22 arranged in pairs. Space is provided between each pair of fingers to accommodate the fins and tail bones of the fish. The outer sides 22a of each pair of fingers conform substantially to the side walls of the trough B and are adapted to engage the ribs of fish issuing from the gashing blades and gashing knives, and press said ribs against the side walls of the trough and cause the knife edges to engage along the outer sides of said ribs and scrape meat therefrom as said trough increases in depth.

A pair of driving chains 23 are provided. The one member of each pair of fingers is secured to one of these chains 23, while the other finger of each pair is secured to the other driving chain 23 so as to permit said fingers to straddle the fin and tail bones of the fish. A pair of driving sprockets 24 engage the respective chains 23. These driving sprockets 24 are mounted on an extension of the main shaft 3 which protrudes from the housing 2, as shown in Figs. 1 and 5. The chains 23 pass around idler sprockets 25 mounted on a common shaft 25a supported at a point clear of the end of the scraping knife. Suitable tension means, not shown, permit adjustment of the idler sprocket so as to keep the chains taut.

The deflector portions 19f of the gashing knives housing 19 extend over the sides of the fingers 22 as said fingers pass over the driving sprockets 24. These deflectors or guide portions 19f cause the severed portions of the fish between the belly and the tail to pass on the outside of the fingers so that they will later pass on the outside of the knives and not become mashed between said fingers and said knives.

Before a fish enters between the gashing blades and gashing knives, said gashing knives just clear the gashing blades. As the fish passes between said knives and blades, the gashing knives raise so as to prevent contact with the backbone of the fish. This is accomplished automatically by an elevating mechanism, to be described hereinafter.

Fish side engaging plates 26 are positioned adjacent to the outer sides of the gashing blades and knives between the sharpened edges 19e and 20d of their respective housings. There are preferably two of these side engaging plates. The forward ends of these fish side engaging plates 26 flare outwardly. The rear ends of said plates engage the outer sides of the gashing blades and knives. The distance between the forward edges of said blades is sufficiently wide to pass on the outside of any fish adapted to be cut by the machine.

The central portions 26a of these plates are belled longitudinally forming concave surfaces which diminish in size towards the rear edges of said plates. These concave surfaces 26a conform substantially to the curvature of the sides of the fish. A bracket 26b extends outwardly from the forward portion of each plate 26. Forward supporting arms 27 are pivotally secured by their extended ends to these brackets. These arms permit transverse movement of the plates 26 but prevent longitudinal movement thereof. These arms 27 are mounted on shafts 27a supported by framework F which also supports a suitable centering means C which alines the fish with the gashing knives and blades. Other brackets 26c extend outwardly from each plate 26 near the rear end thereof. These brackets are connected through link members 28 to rear supporting arms 29. The link members 28 permit a certain amount of pivotal movement of the plates about the junction of the brackets 26b and the arms 27.

Each set of rear supporting arms 29 is connected to a vertically extending cam shaft 30 supported by the framework F of the centering means. A cam 31 is mounted at the upper portion of each shaft 30. Each cam is provided with a socket portion on the forward side thereof adapted to receive the one end of a cam rod 32. Each cam rod 32 extends forwardly and joins a rocker arm 33. Each rocker arm 33 is secured to a shaft 34, mounted above the framework F and supported in suitable journals 35. This shaft 34 extends transversely. The one rocker arm 33 is connected to a spring 36 which causes both of said rocker arms to maintain their respective cam rods in the sockets of said cams.

An arm member 37 is mounted intermediate the ends of the shaft 34 and is pivotally connected to the one end of an adjustable link member 38, the other end of which is connected to an arm of a lever member 39. The lever member 39 is supported intermediate its ends upon a fulcrum member 40. Said fulcrum member is adjustable relative to the lever and relative to a support 41 so as to accurately adjust the length of the arms of the lever.

The lever extends to a point adjacent to the before mentioned extended portion of the connecting member 19d of the gashing knives housing 19. A link member 42 connects this end of the arm with said housing. Thus transverse movement of the fish side engaging plates 26 causes a substantially perpendicular movement of the gashing knives 17 and their housing 19. Because of the compensating spring 18 only slight pressure is needed on the fish side engaging plates in order to raise the gashing knives.

The operation of my fish bone removing machine is as follows: The fish with its head and entrails removed is positioned in the centering means C, back downward and tail first. The centering means, by any suitable arrangement directs the tail fins and side fins of the fish between the gashing blades and gashing knives in such a manner that the backbone of the fish is in alinement with the adjacent edges of the gashing blades and gashing knives. These blades and knives revolve quite rapidly and when they once engage the fish they propel said fish on through while gashing it. As the fins and tail of the fish are extremely thin, the inner surfaces of the pairs of gashing blades and gashing knives may be positioned quite close together; in fact so close that their inner sides actually engage the bones of the tail and fins. The tail portion of the fish being very thin and the backbone therein quite small, the gashing knives at first almost engage the gashing blades, but as the width of the fish increases the gashing knives raise so that their edges just clear the backbone, thereby prolonging the life of the blades. The gashing knives form two gashes, one on either side of the tail fins and belly fins, from the tail of the fish to the belly. The gashing blades form similar gashes from the tail along the backbone underneath the belly to a point opposite the gills, the head having been removed. The four gashes formed by these blades sever the fish except for a small strip of meat along the sides of the backbone and except for the meat clinging to the ribs, as shown in Fig. 6. After passing the gashing blades and knives, the deflector 19f of the gashing knives housing deflects the meat between the tail and the belly outwardly so as to pass on the outside of the rib engaging fingers 22. Normally these portions of the fish tend to spread outwardly of their own accord as they are severed from the belly and tail fins and there is nothing to support them. Immediately after the fish has been acted upon by the gashing blades and knives, the upper, sharpened edge of the lower housing 20 severs the remaining strip of flesh hanging on to the backbone between the ribs and tail. If the upper edge of the housing 20 does not do so, the forward end portion of the scraping knives perform this operation. Continuous movement of the fish brings into action the scraping knives. The fingers 22 press the ribs against these knives in such a manner that these knives scrape therealong causing the flesh or meat portions to pass along the outside thereof, as shown in Fig. 9. The trough B becomes deeper until the knife edges are above the ribs, as shown in Fig. 10. When this stage is reached the meat portions of the fish have been completely severed from the bony portions thereof and said bony portions are discharged out the end of the trough. By making the sides of the trough B and adjacent portions 22a of the fingers 22 straight, the action of the scraping knives is enhanced as the tendency of the ribs to curve, as shown in Figs. 6, 7, 8 and 9, keeps said ribs in the most favorable position for scraping.

It will be noted that by careful balancing of the gashing blades, the shifting mechanism therefor may be dispensed with and the gashing blades may be shifted by engagement with the backbone of the fish. This arrangement of course, causes more rapid dulling of the gashing blades and knives than does the arrangement with the shifting mechanism.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a fish bone removing machine, the combination with a fish tail and fin centering means, of gashing members mounted at the one end of said centering means, gashing means mounted above said gashing members, said gashing means and members adapted to slit a fish substantially to its backbone along its back and belly on either side of and adjacent to the tail and fins thereof, and scraping and severing means adapted to sever meat from the backbone of said fish and scrape said meat from the ribs thereof.

2. In a fish bone removing machine, the combination with a fish tail and fin centering means, of gashing members mounted at the one end of said centering means, gashing means mounted above said gashing members, said gashing members adapted to slit a fish along its back, said gashing means adapted to slit a fish along the belly thereof, said gashing means shiftable so that said gashing means and members slit said fish to the backbone thereof although said backbone varies in size.

3. In a fish bone removing machine, the combination with a fish tail and fin centering means, of gashing members mounted at the one end of said centering means, gashing means mounted above said gashing members said gashing members adapted to slit a fish along its back, said gashing means adapted to slit a fish along its belly, said gashing means shiftable so that said gashing means and members slit said fish to the backbone thereof although said backbone varies in size, and scraping means adapted to scrape meat from the backbone and ribs of a fish.

4. In a fish bone removing machine, the combination with a fish tail and fin centering means, of gashing members mounted at the one end of said centering means, gashing means mounted above said gashing members, said gashing members adapted to slit a fish along its back, said gashing means adapted to slit a fish along its belly, said gashing means shiftable so that said gashing means and members slit said fish to the backbone thereof although said backbone varies in size, and scraping and severing means adapted to sever meat from the backbone of said fish and scrape meat from the ribs thereof.

5. In a machine of the class described, revolubly mounted gashing members, revolubly mounted gashing means positioned above said gashing members, said gashing means and members adapted to slit a fish along its back and belly at either side of and adjacent to its fins and tail, and scraping means adapted to scrape the meat of said fish from its backbone and ribs.

6. In a machine of the class described, revolubly mounted gashing members, revolubly mounted gashing means, said gashing means and members adapted to slit a fish substantially to its backbone along its back and belly on either side of and adjacent to its fins and tail, and scraping and severing means adapted to sever meat from the backbone of said fish and scrape said meat from the ribs thereof.

7. In a machine of the class described, revolubly mounted gashing members, revolubly mounted gashing means, said gashing members adapted to slit a fish along its back at either side and adjacent to its fins and tail, said gashing means adapted to slit a fish along its belly at either side and adjacent to its fins and tail, said gashing means shiftable so that said gashing means and members slit said fish to the backbone thereof although said backbone varies in size.

8. In a machine of the class described, revolubly mounted gashing members, revolubly mounted gashing means, said gashing members adapted to slit a fish along its back at either side and adjacent to its fins and tail, said gashing means adapted to slit a fish along its belly at either side and adjacent to its fins and tail, said gashing means shiftable so that said gashing means and members slit said fish to the backbone thereof although said backbone varies in size, and scraping means adapted to scrape meat from the backbone and ribs of a fish.

9. In a machine of the class described, revolubly mounted gashing members, revolubly mounted gashing means positioned above said gashing members, said gashing members adapted to slit a fish along its back, said gashing means adapted to slit a fish along its belly, said gashing means shiftable so that said gashing means and members slit said fish to the backbone thereof although said backbone varies in size, and scraping and severing means adapted to sever meat from the backbone of said fish and scrape meat from the ribs thereof.

10. In a fish bone removing machine, the combination with a centering means, of gashing members mounted at the one end of said centering means, gashing means shiftably mounted above and adjacent to said gashing members.

11. In a fish bone removing machine, the combination with a centering means, of gashing members mounted at the one end of said centering means, gashing means shiftably mounted above and adjacent to said gashing members, deflector means mounted on said gashing means, fish severing and scraping means co-operating with said gashing members, said deflectors adapted to guide the meat of a fish into proper relation with said scraping means.

12. In a fish bone removing machine, the combination with a fish tail and fin centering means, of gashing members mounted at the one end of said centering means, gashing means mounted above said gashing members, said gashing means and members adapted to slit a fish along its back and belly at either side of the fins thereof, scraping means constructed and arranged to engage the ribs and scrape the meat of said fish from said ribs, and deflector means for guiding a fish issuing from said gashing means and gashing members into proper relation to said scraping means.

13. In a fish bone removing machine, the combination with a fish tail and fin centering means, of gashing members mounted at the one end of said centering means, gashing means mounted above said gashing members, said gashing members adapted to slit a fish along its back, said gashing means adapted to slit a fish along its belly, said gashing means shiftable so that said gashing means and members slit said fish to the backbone thereof although said backbone varies in size, scraping and severing means adapted to sever meat from the backbone of said fish and scrape meat from the ribs thereof, and deflector means for guiding a fish issuing from said gashing means and gashing members into proper relation to said scraping and severing means.

14. In a machine of the class described, revolubly mounted gashing members, revolubly mounted gashing means, said gashing members adapted to slit a fish along its back at either side and adjacent to its fins and tail, said gashing means adapted to slit a fish along its belly at either side and adjacent to its fins and tail, said gashing means shiftable so that said gashing means and members slit said fish to the backbone thereof although said backbone varies in size, scraping means adapted to scrape meat from the backbone and ribs of a fish, and deflector means for guiding a fish issuing from said gashing means and gashing members into proper relation to said scraping means.

15. In a fish bone removing machine, the combination with a fish tail and fin centering means, of gashing members mounted at the one end of said centering means gashing means mounted above said gashing members, said gashing means and members adapted to slit a fish substantially to its backbone along its back and belly on either side of and adjacent to the tail and fins thereof, scraping and severing means adapted to sever meat from the backbone of said fish and scrape said meat from the ribs thereof, and shifting means operated by the varying width of a fish passing through said gashing means and members for shifting said gashing means so as to clear the backbone of said fish and yet cut adjacent to said backbone, although said backbone varies in size.

16. In a fish bone removing machine, the combination with a fish tail and fin centering means, of gashing members mounted at the one end of said centering means, gashing means mounted above said gashing members, said gashing means and members adapted to slit a fish along its back and belly at either side of the fins thereof, scraping means adapted to scrape the meat of said fish from its backbone and ribs, deflector means for guiding a fish issuing from said gashing means and gashing members into proper relation to said scraping means, and shifting means operated by the varying width of a fish passing through said gashing means and members for shifting said gashing means so as to clear the backbone of said fish and yet cut adjacent to said backbone, although said backbone varies in size.

17. In a machine of the class described, revolubly mounted gashing members, revolubly mounted gashing means, said gashing members adapted to slit a fish along its back at either side and adjacent to its fins and tail, said gashing means adapted to slit a fish along its belly at either side and adjacent to its fins and tail, and shifting means operated by the varying width of a fish passing through said gashing means and members for shifting said gashing means so as to clear the backbone of said fish and yet cut adjacent to said backbone, although said backbone varies in size.

18. In a fish bone removing machine, the combination with a fish tail and fin centering means, of gashing members counted at the one end of said centering means, gashing means mounted above said gashing members, said gashing members adapted to slit a fish along its back, said gashing means adapted to slit a fish along its belly, said gashing means shiftable so that said gashing means and members slit said fish to the backbone thereof although said backbone varies in size, housing means for said gashing members, other housing means for said gashing means, deflectors forming a part of said first housing means, scraping means forming a continuation of said second housing means, said deflectors adapted to direct fish issuing from said gashing means and members into proper relation to said scraping means.

19. In a fish bone removing machine, the combination with a fish tail and fin centering means, of gashing members mounted at the one end of said centering means, gashing means mounted above said gashing members, said gashing members adapted to slit a fish along its back, said gashing means adapted to slit a fish along its belly, said gashing means shiftable so that said gashing means and members slit said fish to the backbone thereof although said backbone varies in size, housing means for said gashing members, other housing means for said gashing means, deflectors forming a part of said first housing means, scraping means forming a continuation of said second housing means, said deflectors adapted to direct fish issuing from said gashing means and members into proper relation to said scraping means.

In testimony whereof, I have hereunto set my hand at San Diego, California.

WILLIAM H. HUNT.